(12) United States Patent  
Yamaguchi (10) Patent No.: US 9,117,160 B2  
(45) Date of Patent: Aug. 25, 2015

(54) COLOR CONVERSION TABLE CREATION METHOD, NON-TRANSITORY COMPUTER READABLE RECORDING MEDIUM STORED WITH COLOR CONVERSION TABLE CREATION PROGRAM, AND COLOR CONVERSION TABLE CREATING APPARATUS

(71) Applicant: KONICA MINOLTA, INC., Chiyoda-ku (JP)

(72) Inventor: Takeshi Yamaguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/542,762

(22) Filed: Nov. 17, 2014

(65) Prior Publication Data

US 2015/0138574 A1    May 21, 2015

(30) Foreign Application Priority Data

Nov. 21, 2013 (JP) ................................ 2013-241052

(51) Int. Cl.
*H04N 1/60* (2006.01)
*G06K 15/02* (2006.01)
*G06K 15/00* (2006.01)

(52) U.S. Cl.
CPC .......... *G06K 15/1878* (2013.01); *G06K 15/027* (2013.01); *G06K 15/407* (2013.01); *H04N 1/605* (2013.01); *H04N 1/6019* (2013.01)

(58) Field of Classification Search
None
See application file for complete search history.

(56) References Cited

U.S. PATENT DOCUMENTS

| | | | | |
|---|---|---|---|---|
| 6,985,678 B2 * | 1/2006 | Maebashi et al. | ........... | 399/49 |
| 7,333,740 B2 * | 2/2008 | Sakamoto et al. | ........... | 399/49 |
| 7,421,217 B2 * | 9/2008 | Sugita et al. | ........... | 399/49 |
| 8,040,378 B2 * | 10/2011 | Toda | ........... | 358/1.9 |
| 8,139,266 B2 * | 3/2012 | Iida | ........... | 358/518 |
| 8,797,614 B2 * | 8/2014 | Yamaguchi | ........... | 358/523 |
| 8,861,025 B2 * | 10/2014 | Hoshino | ........... | 358/518 |
| 8,885,214 B2 * | 11/2014 | Saiki | ........... | 358/523 |
| 2012/0275801 A1 * | 11/2012 | Higuchi et al. | ........... | 399/28 |

FOREIGN PATENT DOCUMENTS

| | | |
|---|---|---|
| JP | 2004-147257 A | 5/2004 |
| JP | 2012-249182 A | 12/2012 |

* cited by examiner

*Primary Examiner* — Scott A Rogers
(74) *Attorney, Agent, or Firm* — Buchanan Ingersoll & Rooney PC (57) ABSTRACT

Provided is a color conversion table creation method for creating a color conversion table for an image forming apparatus which forms an image by performing, on an input color value with total use amount of color material exceeding set amount, a process for reducing the total use amount of color material, the table presenting correspondence between the input color value input to the image forming apparatus and an output color value in a device-independent color space. The method includes: acquiring an input color value of a patch image for creating the table; when the total use amount of color material defined by the acquired input color value is around the set amount, adjusting the input color value to have a smaller difference between the total use amount and the set amount; and creating the color conversion table using the patch image with the adjusted input color value.

12 Claims, 8 Drawing Sheets

COLOR CONVERSION TABLE CREATION METHOD, NON-TRANSITORY COMPUTER READABLE RECORDING MEDIUM STORED WITH COLOR CONVERSION TABLE CREATION PROGRAM, AND COLOR CONVERSION TABLE CREATING APPARATUS

CROSS-REFERENCE TO RELATED APPLICATION

This application is based on Japanese Patent Application No. 2013-241052 filed on Nov. 21, 2013, the contents of which are incorporated herein by reference.

BACKGROUND

1. Technical Field

The present invention relates to a color conversion table creation method, a non-transitory computer readable recording medium stored with a color conversion table creation program, and a color conversion table creating apparatus, for creating a color conversion table.

2. Description of Related Art

To create a color conversion table necessary for color management, an image forming apparatus outputs a plurality of patch images corresponding to the respective combinations of C (cyan), M (magenta)), Y (yellow), and K (black), and then the CMYK values of each patch image and corresponding measured color values (L*a*b* values, XYZ values, or the like) are associated with each other. Since it is difficult to output patch images corresponding to all the respective combinations of C, M, Y, and K and measure the colors thereof, a general way is to output approximately several hundred patch images, associate the CMYK values and the measured color values with each other, and then perform interpolation calculation, to create a color conversion table of a predetermined size.

In the electrophotographic or ink-jet image forming apparatus, printing using 100% of the amount of color material of all of C, M, Y, and K normally results in failure in toner fixation, spreading of ink, or the like. To avoid such problems, the total use amount of color material is limited in general.

Attempts have been made to improve accuracy of a color profile for image forming apparatus with limitation of total use amount of color material. For example, Japanese Patent Application Laid-Open No. 2004-147257 proposes a technique for reducing deterioration of accuracy attributable to a process for limiting the total use amount of color material. In this technique, output color values at the perimeter of a color gamut when the total use amount of color material is not limited are adjusted so that the output color values would also be at the perimeter of the color gamut after the limitation of the total use amount of color material is imposed. However, this technique has a problem that an interpolation error attributable to the process for limiting the total use amount of color material occurs at the time of performing interpolation calculation for a color conversion table, which makes it difficult to obtain an accurate color-conversion table.

Meanwhile, Japanese Patent Application Laid-Open No. 2012-249182 proposes a technique for improving color accuracy in a low-lightness area (i.e., area with limitation of total use amount of color material) by increasing the number of patch images in a color chart. With this technique, it is possible to prevent an interpolation error attributable to a process for limiting the total use amount of color material. However, this technique is not preferable since long time is required for the operation of measuring color of patch images and data processing.

In the image forming apparatus with limitation of total use amount of color material, a certain amount is set as a set amount at which the total use amount of color material is started to be limited, and a process for gradually reducing the input CMYK values having the total use amount of color material exceeding the set amount is performed, in order to prevent gradation characteristics from being deteriorated by a process for limiting the total use amount of color material. Hence, it is desired to create a highly-accurate color conversion table for an image forming apparatus which selectively performs, on input CMYK values having the total use amount of color material exceeding the set amount, a process for reducing the total use amount of color material, without increasing the number of patch images in a color chart.

SUMMARY

The present invention is achieved in view of the problems described above. Therefore, an object of the present invention is to provide a color conversion table creation method, a non-transitory computer readable recording medium stored with a color conversion table creation program, and a color conversion table creating apparatus which are capable of creating a highly-accurate color conversion table for an image forming apparatus which forms an image by selectively performing, on input color values having total use amount of color material exceeding set amount, a process for reducing the total use amount of color material, without increasing the number of patch images in a color charts.

To achieve at least one of the abovementioned objects, a color conversion table creation method reflecting one aspect of the present invention is a color conversion table creation method for creating a color conversion table for an image forming apparatus which forms an image by selectively performing, on an input color value with total use amount of color material exceeding set amount, a process for reducing the total use amount, the color conversion table presenting correspondence between the input color value input to the image forming apparatus and an output color value in a device-independent color space indicating an output color to be output from the image forming apparatus and corresponding to the input color value, and includes the steps of: (a) acquiring an input color value of a patch image to be used for creating the color conversion table; (b) determining whether or not the total use amount of color material defined by the input color value acquired in the step (a) is around the set amount; (c) when it is determined in the step (b) that the total use amount of color material is around the set amount, adjusting the input color value of the patch image so that difference between the total use amount and the set amount would be smaller; and (d) creating the color conversion table by using the patch image with the input color value adjusted in the step (c).

Preferably, the color conversion table creation method further includes, before the step (b), the steps of: (e) acquiring a formula for selectively performing, on the input color value with the total use amount of color material exceeding the set amount, the process for reducing the total use amount; and (f) finding the set amount by using the formula acquired in the step (e).

Preferably, the color conversion table creation method further includes, before the step (b), the steps of: (g) acquiring a color conversion table created in advance for the image forming apparatus; and (h) analyzing the color conversion table acquired in the step (g), and thereby obtaining the set amount.

Preferably, the color conversion table creation method further includes, before the step (b), the steps of: (i) acquiring measured color values of a plurality of patch images formed by the image forming apparatus on the basis of predetermined input color values; and (j) obtaining the set amount on the basis of the measured color values acquired in the step (i) and the input color values of the patch images.

The objects, features, and characteristics of this invention other than those set forth above will become apparent from the description given herein below with reference to preferred embodiments illustrated in the accompanying drawings.

DETAILED DESCRIPTION

Hereinafter, embodiments of the present invention will be described in detail with reference to the accompanying drawings.

Figure 1:
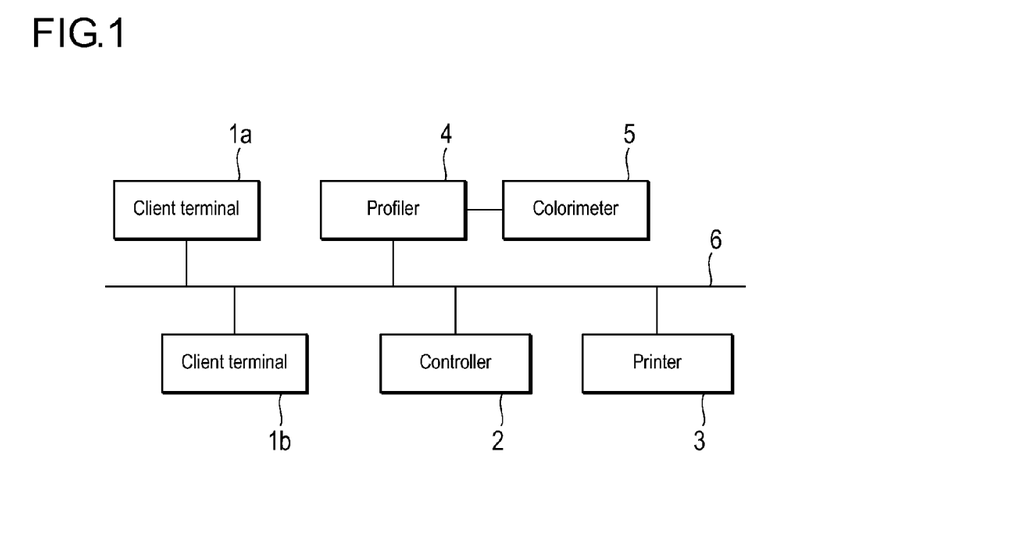
FIG. 1 is a block diagram illustrating an overall configuration of a print system to which a color conversion table creating apparatus according to an embodiment of the present invention is applied.

FIG. 1 is a block diagram illustrating an overall configuration of a print system to which a color conversion table creating apparatus according to an embodiment of the present invention is applied.

As illustrated in FIG. 1, the print system includes client terminals 1a and 1b, a controller 2, a printer 3, a profiler 4, and a colorimeter 5. The client terminals 1a and 1b, the controller 2, the printer 3, and the profiler 4 are connected to each other via a network 6 so as to communicate with each other. In addition, the profiler 4 and the colorimeter 5 are connected via a dedicated line.

The network 6 comprises a local area network (LAN) connecting computers and networking equipment according to a standard such as Ethernet, fiber distributed data interface (FDDI), or wireless fidelity (Wi-Fi), or a wide area network (WAN) connecting LANs to each other with dedicated lines, or the like.

Alternatively, the controller 2 and the printer 3 may be connected to each other via a dedicated line. In addition, the kinds and the number of devices connected to the network 6 are not limited to those in the example illustrated in FIG. 1.

Figure 2:
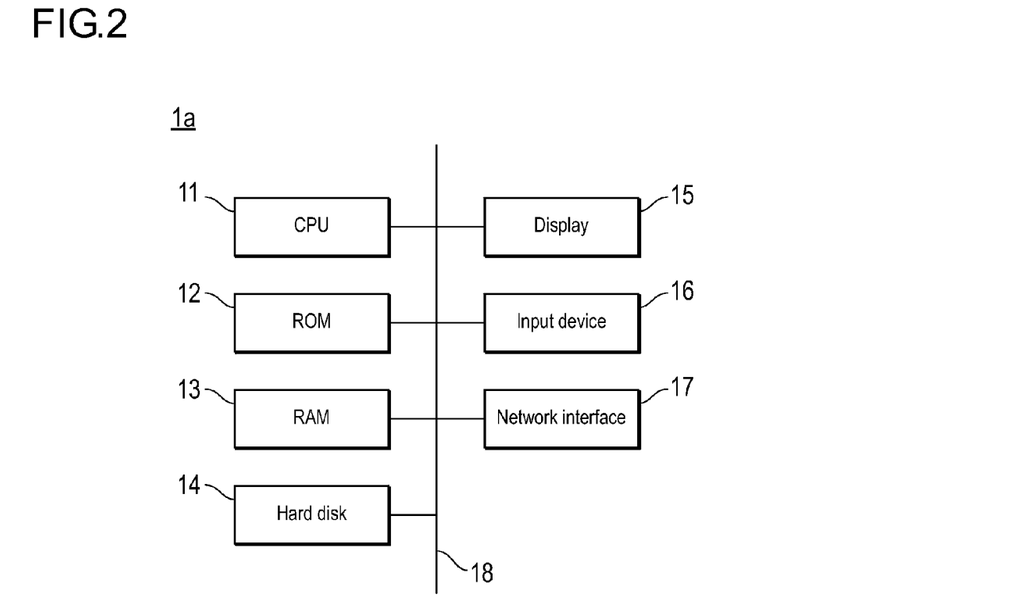
FIG. 2 is a block diagram illustrating a schematic configuration of a client terminal.

FIG. 2 is a block diagram illustrating a schematic configuration of the client terminal 1a. Since the client terminals 1a and 1b have the same configuration, description will be given of the configuration below by using the client terminal 1a as an example. The client terminal 1a is, for example, a general personal computer (PC).

The client terminal 1a includes a central processing unit (CPU) 11, a read only memory (ROM) 12, a random access memory (RAM) 13, a hard disk 14, a display 15, an input device 16, and a network interface 17, which are connected to each other via a bus 18 for sending and receiving signals.

The CPU 11 controls the above-described units and performs various kinds of arithmetic processing according to programs. The ROM 12 stores various programs and various data. The RAM 13 serves as a work space for temporally storing programs and data. The hard disk 14 stores various programs including the operating system (OS), and various data. Moreover, in the hard disk 14, a program is installed, the program being for converting a document file to print data described in a page description language (PDL), which can be interpreted by the controller 2.

The display 15 is, for example, a liquid crystal display, and displays various types of information. The input device 16 includes a pointing device, such as a mouse, and a keyboard, and is used to input various types of information. The network interface 17 is an interface for communicating with other devices via the network 6, and uses a standard such as Ethernet, FDDI, or Wi-Fi.

Figure 3:
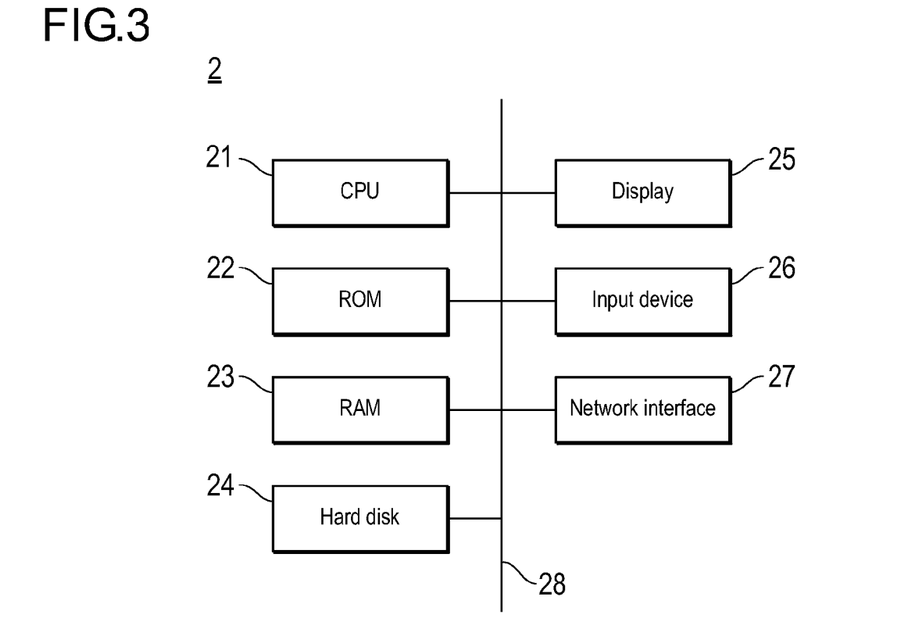
FIG. 3 is a block diagram illustrating a schematic configuration of a controller.

FIG. 3 is a block diagram illustrating a schematic configuration of the controller 2. The controller 2 includes a CPU 21, a ROM 22, a RAM 23, a hard disk 24, a display 25, an input device 26, and a network interface 27, which are connected to each other via a bus 28 for sending and receiving signals. Since the above-described units of the controller 2 have the same functions as those of the units of the client terminal 1a, the description thereof is omitted.

The hard disk 24 stores a color conversion look-up table (LUT) such as an International Color Consortium (ICC) device profile. In addition, the hard disk 24 also stores a raster image processing (RIP) program for analyzing print data described in a page description language and then generating bitmap image data, a color conversion processing program for converting the CMYK values of each pixel of image data by using the color conversion LUT, and a color-material total-amount limit processing program for selectively performing, on the CMYK values having the total use amount of color material exceeding set amount, a process for reducing the total use amount of color material.

Figure 4:
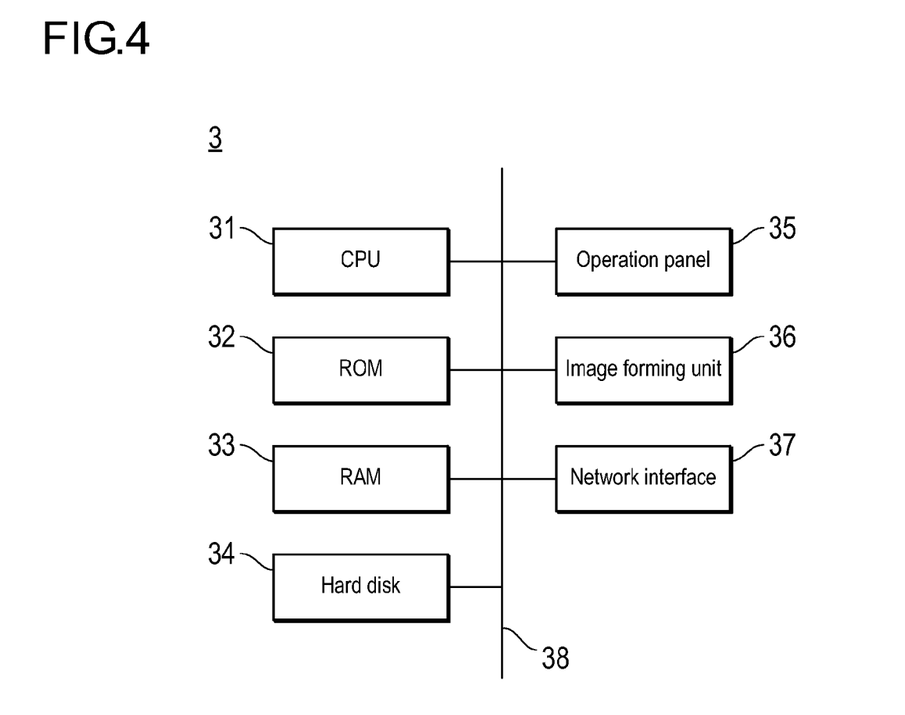
FIG. 4 is a block diagram illustrating a schematic configuration of a printer.

FIG. 4 is a block diagram illustrating a schematic configuration of the printer 3. The printer 3 includes a CPU 31, a ROM 32, a RAM 33, a hard disk 34, an operation panel 35, an image forming unit 36, and a network interface 37, which are connected to each other via a bus 38 for sending and receiving signals. In the following, description is omitted for the above-described units of the controller 3 each having the same function as that of a corresponding unit of the client terminal 1a.

The operation panel 35 is used to display various types of information and input various instructions. The image forming unit 36 forms an image based on image data received from the controller 2 on a recording sheet such as paper, by using a known image forming process such as an electrophotographic process. The image forming unit 36 forms an image by using toners (color materials) of four colors, i.e., C, M, Y, and K.

The controller 2 and the printer 3 of this embodiment serve as an image forming apparatus. The image forming apparatus forms an image while selectively performing, on input CMYK values having the total use amount of color material exceeding set amount, the process for reducing the total use amount of color material.

Figure 5:
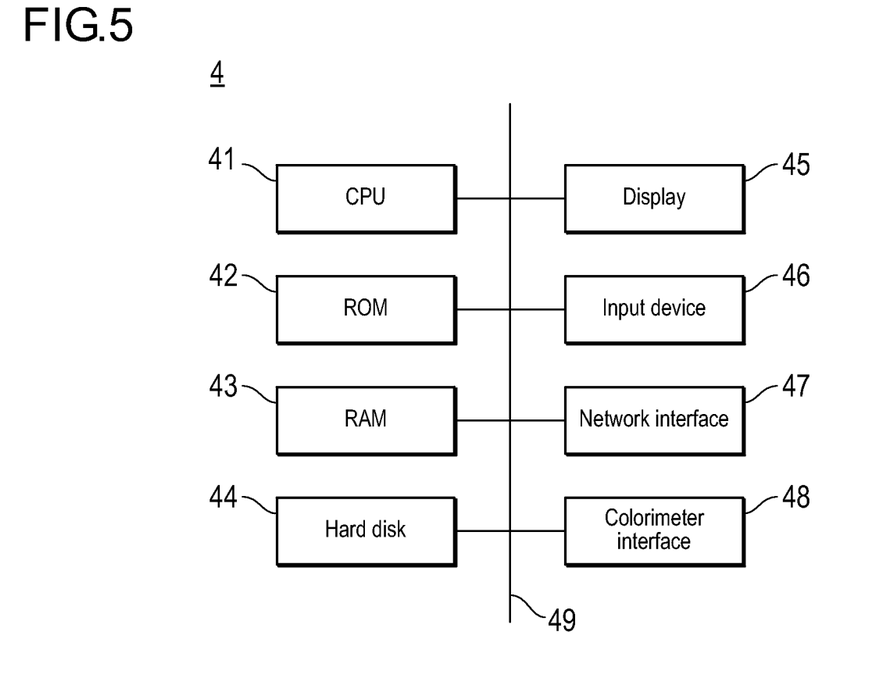
FIG. 5 is a block diagram illustrating a schematic configuration of a profiler.

FIG. 5 is a block diagram illustrating a schematic configuration of the profiler 4. The profiler 4 functioning as a color conversion table creating apparatus is, for example, a general PC.

The profiler 4 includes a CPU 41, a ROM 42, a RAM 43, a hard disk 44, a display 45, an input device 46, a network interface 47, and a colorimeter interface 48, which are connected to each other via a bus 49 for sending and receiving signals. In the following, description is omitted for the above-described units of the profiler 4 each having the same function as that of a corresponding unit of the client terminal 1a.

The colorimeter interface 48 is an interface for communicating with the locally-connected colorimeter 5. The colorimeter 5 includes three kinds of sensors having approximately the same spectral sensitivity as that of human eyes, for example, and measures color on the basis of output values (XYZ values) for each part of a color image from the three kinds of sensors.

The hard disk 44 stores a color conversion table creation program for creating the color conversion LUT.

Figure 6:
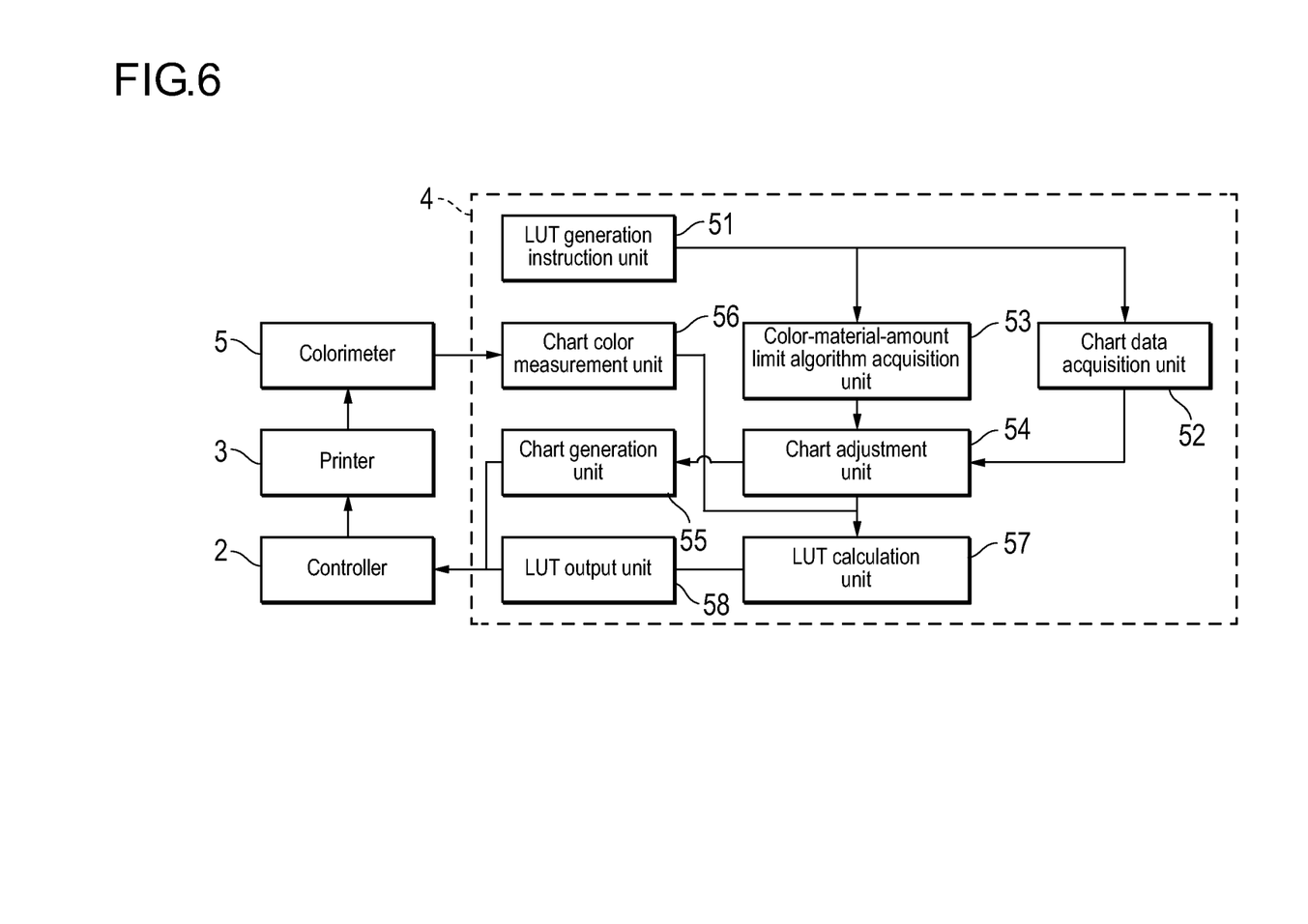
FIG. 6 is a functional block diagram illustrating color conversion table creation functions of the profiler.

FIG. 6 is a functional block diagram illustrating color conversion table creation functions of the profiler 4. The profiler 4 includes an LUT generation instruction unit 51, a chart data acquisition unit (input color value acquisition unit) 52, a color-material-amount limit algorithm acquisition unit (formula acquisition unit/finding unit) 53, a chart adjustment unit (determination unit/adjustment unit) 54, a chart generation unit 55, a chart color measurement unit 56, an LUT calculation unit (creation unit) 57, and an LUT output unit 58.

The LUT generation instruction unit 51 starts to create a color conversion LUT upon receipt of an instruction from a user or the controller 2. The chart data acquisition unit 52 acquires information on patch images included in a color chart. The color-material-amount limit algorithm acquisition unit 53 acquires algorithm for a color-material total-amount limit process performed by the controller 2 of the image forming apparatus, and finds the set amount at which the total use amount of color material is started to be limited. The chart adjustment unit 54 determines whether or not the total use amount of color material defined by the CMYK values of each patch image is around the set amount, and adjusts the CMYK values of the patch image according to the determination result. The chart generation unit 55 generates chart data of the patch images having the adjusted CMYK values, and then provides a print job to the controller 2. The chart color measurement unit 56 measures colors of the color chart output by the printer 3 of the image forming apparatus, and associates the CMYK values and the measured color values of each patch image with each other. The LUT calculation unit 57 creates a color conversion LUT from the CMYK values and the measured color values of each patch image, which are associated with each other. The LUT output unit 58 registers the color conversion LUT to the controller 2. The above-described functions of the profiler 4 are performed when the CPU 41 executes the above-described color conversion table creation program.

The client terminals 1a and 1b, the controller 2, the printer 3, and the profiler 4 may include components other than those described above, or may omit some of the above-described components.

In the print system configured as described above, a color conversion LUT is created for the image forming apparatus which selectively performs, on input CMYK values having the total use amount of color material exceeding the set amount, a process for reducing the total use amount of color material. In this operation, the CMYK values of each patch image included in the color chart are adjusted in advance, and the LUT is created by using the patch images having the adjusted CMYK values, in order to suppress an interpolation error in the LUT. In the following, operation of the print system for creating an LUT for an image forming apparatus will be described with reference to FIGS. 7 to 10A and 10B.

First, the color-material total-amount limit process performed by the image forming apparatus will be described. In the image forming apparatus of this embodiment, a certain amount is set as the set amount at which the total use amount of color material is started to be limited, in order to prevent the gradation characteristics from being deteriorated by the process of limiting the total use amount of color material. Then, the color-material total-amount limit process for selectively performing, on the input CMYK values having the total use amount of color material exceeding the set amount, the process for gradually reducing the CMYK values is performed.

Figure 7:
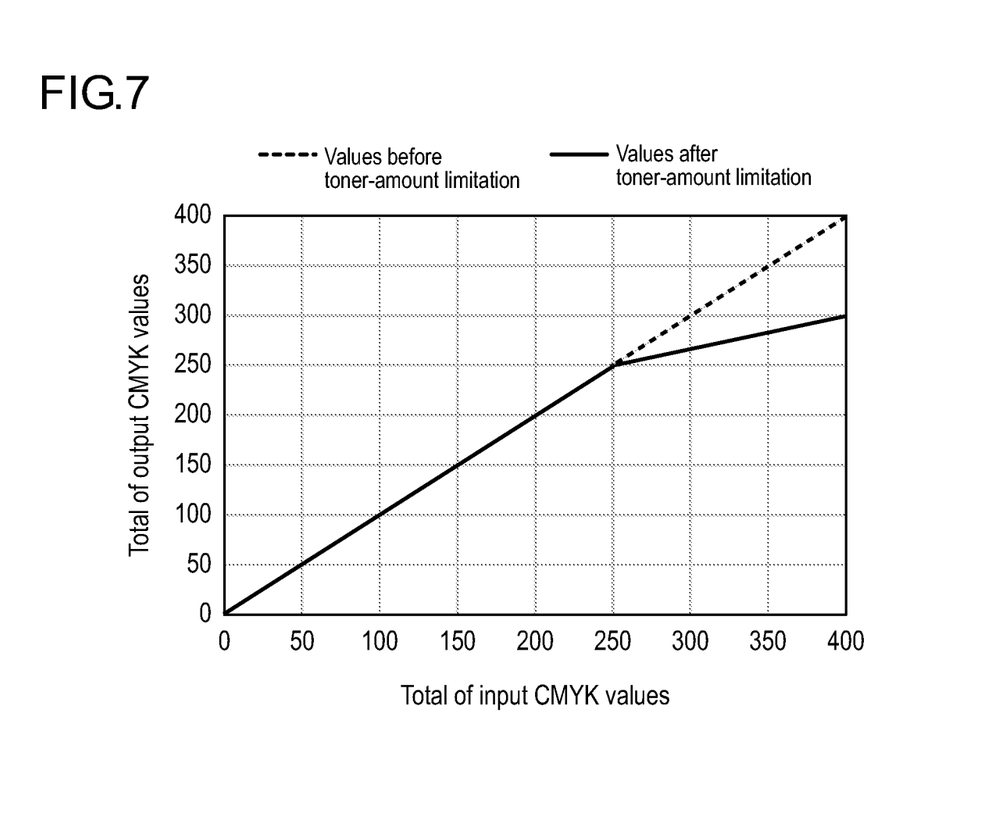
FIG. 7 is a graph for illustrating a color-material total-amount limit process.

FIG. 7 is a graph for illustrating the color-material total-amount limit process. In FIG. 7, the horizontal axis represents the total of the CMYK values before the color-material total-amount limit process (input CMYK values), and the vertical axis represents the total of the CMYK values after the color-material total-amount limit process (output CMYK values). In this embodiment, the total of the input CMYK values and the total of the output CMYK values each correspond to the total use amount of color material. In FIG. 7, the upper limit of the total use amount of color material is set at 300 (%) while the set amount at which the total use amount of color material is started to be limited is set at 250 (%), and the process for gradually reducing the CMYK values is selectively performed on the input CMYK values having the total of the input CMYK values ($0 \leq C,M,Y,K \leq 100$ (%)) exceeding 250.

Specifically, assume that the upper limit of the total of the CMYK values is denoted by TL (=300), the set amount at which the total use amount of color material is started to be limited is denoted by TS (=250), the input CMYK values of a target pixel are denoted respectively by $C_i$, $M_i$, $Y_i$, and $K_i$, and the total of the input CMYK values is denoted by SUM (SUM<400). In this case, when SUM>TS, total T of the output CMYK values is expressed by Equation (1) below.

$$T = (TL-TS)/(400-TS) \times (SUM-TS) + TS \qquad (1)$$

Moreover, on the basis of the total T of the output CMYK values calculated by Equation (1) above, the output CMYK values $C_r$, $M_r$, $Y_r$, and $K_r$ are expressed respectively by Equations (2) to (5) below.

$$C_r = C_i \times T/\text{SUM} \qquad (2)$$

$$M_r = M_i \times T/\text{SUM} \qquad (3)$$

$$Y_r = Y_i \times T/\text{SUM} \qquad (4)$$

$$K_r = K_i \times T/\text{SUM} \qquad (5)$$

On the other hand, when SUM≤TS, the input CMYK values $C_i$, $M_i$, $Y_i$, and $K_i$ are used directly as the output CMYK values $C_r$, $M_r$, $Y_r$, and $K_r$ respectively.

For example, when the input CMYK values are C=80, M=80, Y=80, and K=80 under the condition that the upper limit TL=300 and the set amount TS=250, the total SUM=320>250, resulting in the output CMYK values of C=68, M=68, Y=68, and K=68 by using Equations (1) to (5) above. By contrast, when the input CMYK values are C=60, M=60, Y=60, and K=60, the total SUM=240≤250, resulting in the output CMYK values of C=60, M=60, Y=60, and K=60 without any adjustment.

In this embodiment, the above-described color-material total-amount limit process is performed by the controller 2 of the image forming apparatus. However, the color-material total-amount limit process may be performed by the printer 3 of the image forming apparatus, unlike this embodiment.

In the following, operation of the profiler 4 for creating an LUT for the image forming apparatus will be described with reference to FIGS. 8 to 10A and 10B.

Figure 8:
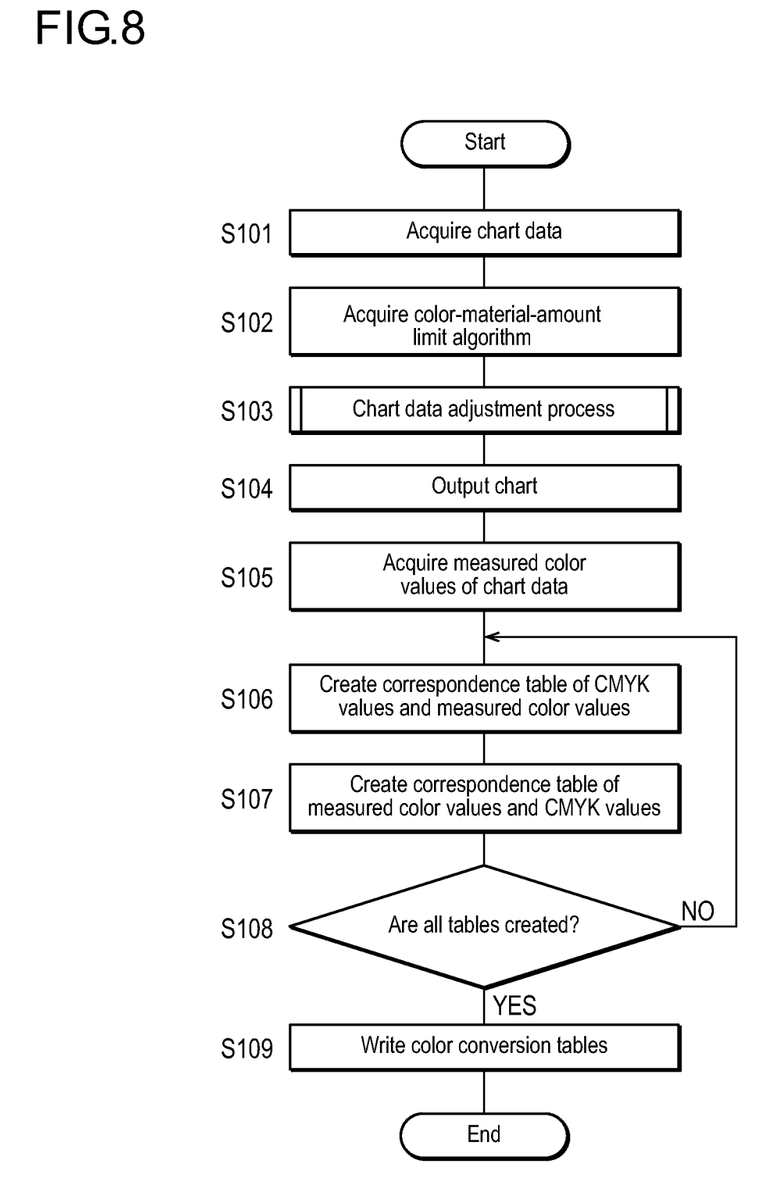
FIG. 8 is a flowchart illustrating a procedure of a color conversion table creation process performed by the profiler.

FIG. 8 is a flowchart illustrating a procedure of the color conversion table creation process performed by the profiler 4. Note that the algorithm illustrated in the flowchart in FIG. 8 is stores in the hard disk 44 of the profiler 4 as a program, and is executed by the CPU 41.

First, the profiler 4 acquires chart data (Step S101). More specifically, the profiler 4 acquires data on a color chart to be used for creating an LUT for the image forming apparatus. The data on the color chart includes information on the number of patch images, the CMYK values of each patch image, the arrangement of the patch images, and the like. The data on the color chart may be standardized by a standard in advance (for example, IT8 chart). The size of each patch image and additional information (guidance information of the colorimeter, and the like), which are included in the color chart, are defined according to the colorimeter 5 to be used.

Then, the profiler 4 acquires a color-material-amount limit algorithm (Step S102). More specifically, the profiler 4 acquires, from the controller 2, an algorithm for performing the above-described color-material total-amount limit process (Equations (1) to (5) above, and the like), and finds the set amount TS for the color-material total-amount limit process (see Equation (1) above).

Then, the profiler 4 performs the chart data adjustment process (Step S103). More specifically, for the patch images having the total use amount of color material defined by the CMYK values which is around the set amount TS of the color-material total-amount limit process, among the plurality of patch images included in the color chart, the profiler 4 adjusts the CMYK values so that the total use amount of color material would be the same as the set amount TS. The details of the chart data adjustment process in Step S103 will be described later.

Then, the profiler 4 outputs a color chart (Step S104). More specifically, the profiler 4 generates a print job for printing a color chart including the patch images having the CMYK values obtained by adjustment by the process in Step S103, and thereby causes the image forming apparatus to output the color chart. The color of each patch image of the color chart output by the image forming apparatus is measured by the colorimeter 5.

Then, the profiler 4 acquires measured color values of the chart data (Step S105). More specifically, the profiler 4 acquires the measured color values (L*a*b* values) of each patch image of the color chart output by the operation in Step S104.

Then, the profiler 4 creates a correspondence table of the CMYK values and the measured color values (Step S106). More specifically, first, the profiler 4 associates the CMYK values of the chart data obtained by adjustment by the process in Step S103, with the measured color values acquired by the operation in Step S105, and thereby creates a CMYK-to-L*a*b* LUT of 4×4×4×4, for example. Then, the profiler 4 performs interpolation calculation for the CMYK-to-L*a*b* LUT of 4×4×4×4 to increase the lattice points in the LUT, and thereby creates a CMYK-to-L*a*b* LUT of 11×11×11×11.

Then, the profiler 4 creates a correspondence table of measured color values and the CMYK values (Step S107). More specifically, the profiler 4 creates an L*a*b*-to-CMYK LUT from the CMYK-to-L*a*b* LUT created by the operation in Step S106. For example, the profiler 4 performs Gamut mapping on the measured color values which are outside a color gamut, and creates an L*a*b*-to-CMYK LUT consisting of the combinations of approximately 33 measured color values (L*a*b*). Since a technique for creating an L*a*b*-to-CMYK LUT from the CMYK-to-L*a*b* LUT is a general LUT creation technique, detailed description is omitted.

Then, the profiler 4 determines whether or not a color conversion table of each of all rendering intents is created (Step S108). More specifically, the profiler 4 determines whether or not an L*a*b*-to-CMYK LUT is created for each of all the three kinds of rendering intents, i.e., colorimetric, perceptual, and saturation intents.

When determining that a color conversion table is not created for any one or some of all the rendering intents (No in Step S108), the profiler 4 returns to the operation in Step S106. Then, the profiler 4 repeats the operations in Steps S106 and 5107 until an L*a*b*-to-CMYK LUT is created for each of all the rendering intents.

On the other hand, when determining that a color conversion table is created for each of all the rendering intents (Yes in Step S108), the profiler 4 writes the color conversion tables (Step S109), and then terminates the process. More specifically, the profiler 4 writes the L*a*b*-to-CMYK LUTs created by the operation in Step S107, to a storage unit such as the hard disk 44, and then terminates the process.

As described above, according to the process in the flowchart illustrated in FIG. 8, the CMYK values of each patch image included in the color chart are adjusted in advance, and LUT tables are created by using the patch images having the adjusted CMYK values, at the time of creating LUTs for the image forming apparatus.

Figure 9:
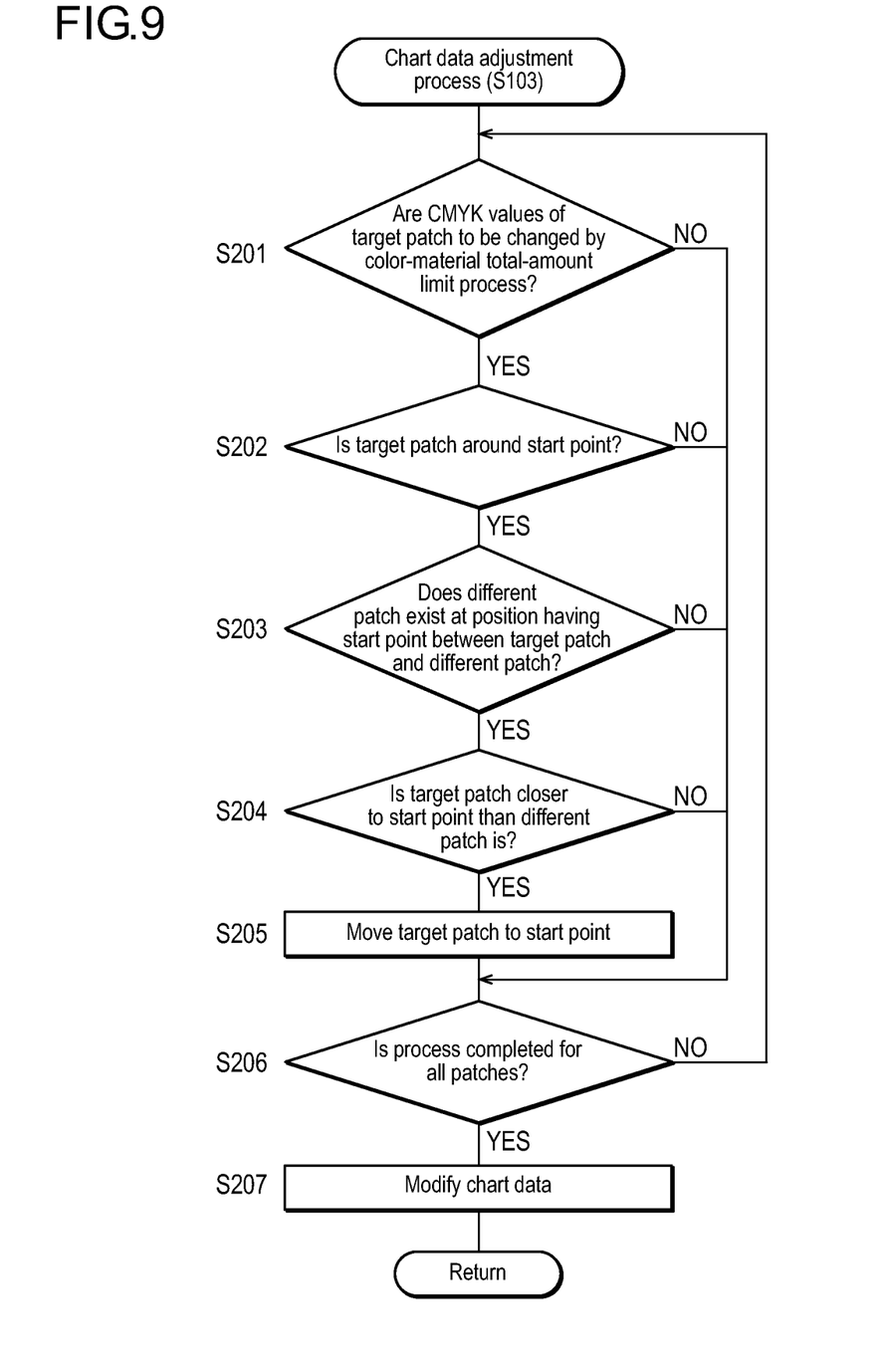
FIG. 9 is a flowchart illustrating a procedure of a chart data adjustment process illustrated in Step S103 in FIG. 8.

FIG. 9 is a flowchart illustrating a procedure of the chart data adjustment process illustrated in Step S103 in FIG. 8. In the chart data adjustment process, for the patch images having the total use amount of color material defined by the CMYK values which is around the set amount TS of the color-material total-amount limit process (see Equation (1) above), among the plurality of patch images included in the color chart, the CMYK values are adjusted so that the total use amount of color material would be the same as the set amount TS.

First, the profiler 4 determines whether or not the CMYK values of a target patch are to be changed by the color-material total-amount limit process (Step S201). More specifically, the profiler 4 determines whether or not the CMYK values of the process-target patch image are to be changed by the color-material total-amount limit process by the image forming apparatus. In this embodiment, when the total of the CMYK values of the process-target patch image exceeds the set amount TS (for example, 250) of the color-material total-amount limit process, the profiler 4 determines that the CMYK values of the target patch are to be changed by the color-material total-amount limit process.

When determining that the CMYK values of the target patch are not to be changed (No in Step S201), the profiler 4 advances to the operation in Step S206. On the other hand, when determining that the CMYK values of the target patch are to be changed (Yes in Step S201), the profiler 4 determines whether or not the target patch is near the start point of the color-material total-amount limit process (Step S202). More specifically, the profiler 4 determines whether or not the total use amount of color material defined by the CMYK values of the process-target patch image is around the set amount TS at which the total use amount of color material is started to be limited by the color-material total-amount limit process. In this embodiment, when the difference between the total of the CMYK values of the process-target patch image and the set amount TS of the color-material total-amount limit process is within a predetermined range (for example, not larger than 34), the profiler 4 determines that the target patch is near the start point.

When determining that the target patch is not near the start point (No in Step S202), the profiler 4 advances to the operation in Step S206. On the other hand, when determining that the target patch is near the start point (Yes in Step S202), the profiler 4 determines whether or not there is a different patch at the position having the start point between the target patch and the different patch itself (Step S203). More specifically, the profiler 4 determines whether or not there is a different patch image on the other side of the process-target patch image from the start point of the color-material total-amount limit process. In this embodiment, when the set amount TS is between the total of the CMYK values of the process-target patch image and the total of the CMYK values of a patch image adjacent to the process-target patch image, the profiler 4 determines that there is the different patch.

When determining that there is no different patch (No in Step S203), the profiler 4 advances to the operation in Step S206. On the other hand, when determining that there is the different patch (Yes in Step S203), the profiler 4 determines whether or not the target patch is closer to the start point than the different patch is (Step S204). More specifically, the profiler 4 determines whether or not the total use amount of color material defined by the CMYK values of the process-target patch image is closer to the set amount TS of the color-material total-amount limit process than the total use amount of color material defined by the CMYK values of the different patch image found by the operation in Step S203 is. In this embodiment, when the total of the CMYK values of the process-target patch image is closer to the set amount TS than the total of the CMYK values of the different patch image is, the profiler 4 determines that the target patch is closer to the start point than the different patch is.

When determining that the target patch is not closer to the start point than the different patch is (No in Step S204), the profiler 4 advances to the operation in Step S206. On the other hand, when determining that the target patch is closer to the start point than the different patch is (Yes in Step S204), the profiler 4 moves the target patch to the start point (Step S205). More specifically, the profiler 4 changes the CMYK values of the process-target patch image so that the total use amount of color material defined by the CMYK values of the process-target patch image would be the same as the set amount TS of the color-material total-amount limit process. In this embodiment, the profiler 4 changes the CMYK values of the patch image so that the total of the CMYK values of the patch image would be the same as the set amount TS of the color-material total-amount limit process.

For example, when a patch image of C=33, M=33, Y=33 and K=33 is near the start point of the color-material total-amount limit process (C=33, M=44, Y=33, and K=33), the profiler 4 changes the CMYK values of the patch image to C=33, M=44, Y=33, and K=33.

Then, the profiler 4 determines whether or not the operations are completed for all the, patches (Step S206). More specifically, the profiler 4 determines whether or not the above-described operations are completed, for each of all the patch images included in the color chart.

When determining that the operations are not completed for any one or some of all the patches (No in Step S206), the profiler 4 returns to the operation in Step S201. Then, the profiler 4 repeats the operations in Steps S201 to S205 until the operations are completed for all the patches.

On the other hand, when determining that the operations are completed for all the patches (Yes in Step S206), the profiler 4 modifies the chart data (Step S207), and then terminates the process. More specifically, the profiler 4 modifies the chart data acquired by the operation illustrated in Step S101 in FIG. 8, so as to apply, to the chart data, the CMYK values of the patch images obtained by the adjustment by the operation illustrated in Step S205.

As described above, according to the process in the flowchart illustrated in FIG. 9, the patch images near the start point of the color-material total-amount limit process are found, and thereby the CMYK values of each of the patch images are changed so that the total use amount of color material defined by the CMYK values of the patch image would be the same as the set amount TS of the color-material total-amount limit process. Such a configuration can prevent an interpolation error in the interpolation calculation for a CMYK-to-L*a*b* LUT.

Figure 10A:
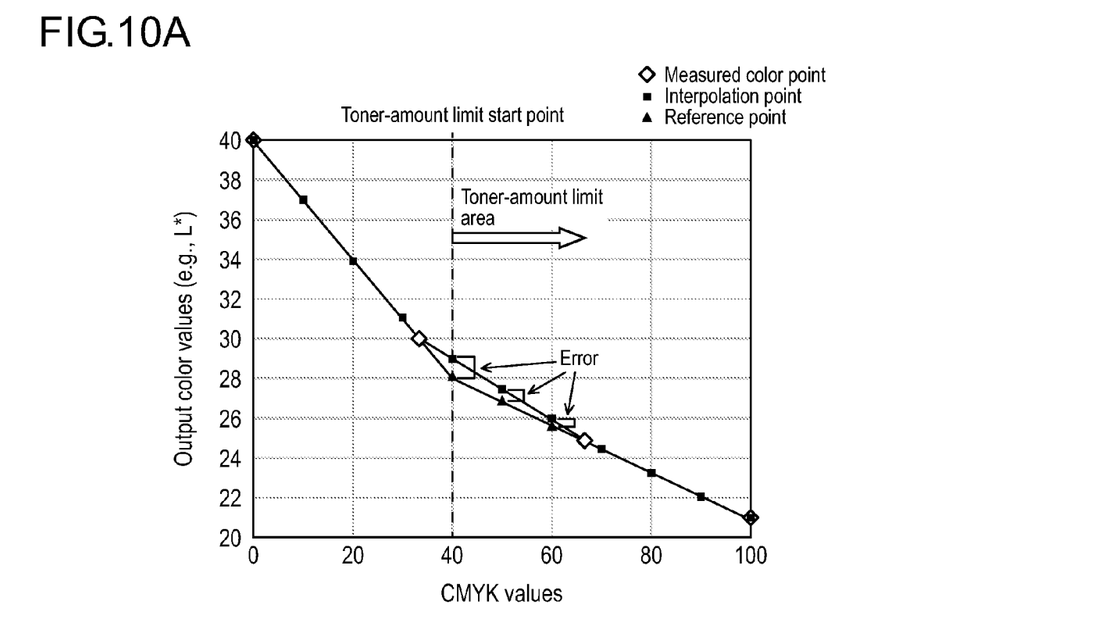
FIGS. 10A and 10B are graphs for illustrating effects of the chart data adjustment process.
Figure 10B:
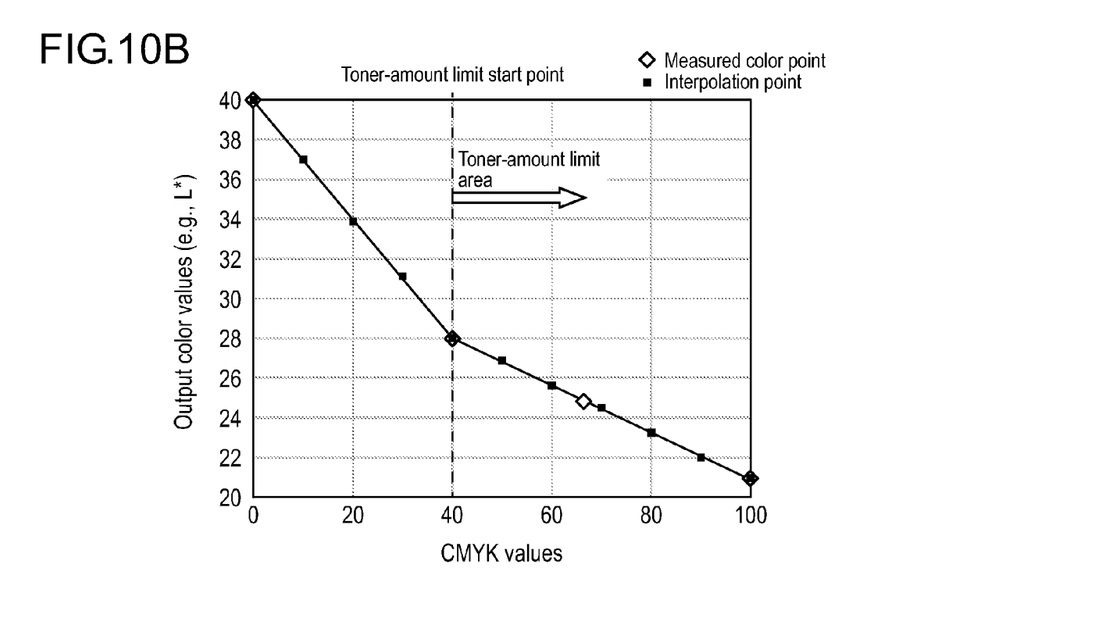

FIGS. 10A and 10B are graphs for illustrating effects of the chart data adjustment process. FIG. 10A is a graph illustrating, as a comparison example, a result of interpolation calculation when the chart data adjustment process is not performed, and FIG. 10B is a graph illustrating a result of interpolation calculation when the chart data adjustment process is performed. With reference to FIGS. 10A and 10B, description will be given by taking, as an example, the case of extending a CMYK-to-L*a*b* LUT of 4×4×4×4 to a CMYK-to-L*a*b* LUT of 11×11×11×11 by interpolation calculation.

In each of FIGS. 10A and 10B, the vertical axis represents the output color values in the LUT, while the horizontal axis represents the values of the remaining color component among the color components C, M, Y, and K when the input color values of three of the color components are fixed. For example, the horizontal axis represents the values of M=0 to 100 when the values C, Y, and K are fixed as C=66, Y=66, and K=33.

The points marked by rhombus at 0, 33(40), 66, and 100 on the horizontal axis in FIGS. 10A and 10B indicate the values of a corresponding one of C, M, Y, and K of the patch images output by the image forming apparatus, and correspond to measured color points for which measured color values are acquired as output color values. The points marked by black square at 0, 10, 20, 30, 40, 50, 60, 70, 80, 90, and 100 on the horizontal axis in FIGS. 10A and 10B indicate interpolation points for which output color values are obtained by interpolation calculation using the output color values (measured color values) of the above-described measured color points. In addition, the broken line in FIGS. 10A and 10B indicates the position corresponding to the set amount TS at which the total use amount of color material is started to be limited by the color-material total-amount limit process.

As illustrated in FIGS. 10A and 10B, the relational expression representing the relationship between the input CMYK values and the output color values has an inflection point at the position corresponding to the set amount TS of the color-material total-amount limit process (position of 40 on the horizontal axis), and the inclinations of the straight lines are different on the left and right of the inflection point.

Accordingly, when an inflection point exists between two measured color points positioned at 33 and 66 on the horizontal axis, as illustrated in FIG. 10A, an interpolation error occurs if the output color values of the interpolation points between the two measured color points (interpolation points positioned at 40, 50, and 60 on the horizontal axis) are obtained by interpolation calculation using the output color values of the above-described two measured color points. Specifically, an error occurs between the output color value of each interpolation point and the actual output color value corresponding thereto (output color value of each reference point marked by black triangle in FIG. 10A), which makes it difficult to obtain an accurate LUT.

By contrast, as illustrated in FIG. 10B, in this embodiment, the CMYK values of each patch image near the inflection point are adjusted so that the total use amount of color material defined by the CMYK values would be the same as the set amount TS, consequently causing the position of the corresponding measured color point to be the same as the position of the inflection point. For example, in FIG. 10B, the measured color point positioned at 33 on the horizontal axis in FIG. 10A is moved to the position of 40 on the horizontal axis. With this configuration, the measured color point does not deviate from the inflection point, which prevents an interpolation error even when interpolation calculation is performed.

Hence, according to this embodiment, it is possible to create a highly-accurate LUT for the image forming apparatus which forms an image by selectively performing, on the input CMYK values having the total use amount of color material exceeding the set amount TS, the process for reducing the total use amount of color material, without increasing the number of patch images in the color chart.

In the above-described embodiment, a calculation algorithm used in the color-material total-amount limit process is acquired, and the set amount TS of the color-material total-amount limit process is found using the calculation algorithm. However, the set amount TS of the color-material total-amount limit process may be obtained in a different way from that using the calculation algorithm.

For example, the set amount TS may be obtained by acquiring an LUT for the image forming apparatus created in advance and then analyzing the acquired LUT. For example, in FIGS. 10A and 10B, the set amount TS can be obtained by finding the inflection point since the inflection point corresponds to the intersection point of the two straight lines determined by the values in the LUT. In this operation, the CPU 41 of the profiler 4 functions as a table acquisition unit for acquiring the LUT for the image forming apparatus created in advance, and a calculation unit for obtaining the set amount TS by analyzing the LUT.

Alternatively, it is also possible to obtain the set amount TS by acquiring the L*a*b* values of a plurality of patch images formed by the image forming apparatus on the basis of predetermined CMYK values, and then obtaining the set amount TS on the basis of the acquired L*a*b* values and the CMYK values of the patch images. An inflection point can be obtained by fitting a straight line or a curved line to data, in this case as in the above. In this operation, the CPU 41 of the profiler 4 functions as a measured-color-value acquisition unit for acquiring measured color values of the plurality of patch images formed on the basis of the predetermined CMYK values, and a calculation unit for obtaining the set amount TS on the basis of the measured color values and the CMYK values of the patch images.

With this configuration, it is possible to create a highly-accurate LUT even when the calculation algorithm used in the color-material total-amount limit process cannot be acquired from the image forming apparatus.

The present invention is not limited to the above-described embodiment, and various modifications can be made within the scope of the claims.

For example, in the above-described embodiment, for a patch image having the total use amount of color material defined by the CMYK values around the set amount of the color-material total-amount limit process, the CMYK values are adjusted so that the total use amount of color material would be the same as the set amount. However, it is not necessary to adjust the CMYK values of the patch image so that the total use amount of color material defined by the CMYK values would be the same as the set amount, as long as the CMYK values are adjusted so that the difference between the total use amount of color material and the set amount would be smaller. In this adjustment, in order to reduce the difference between the total use amount of color material and the set amount, one or more of the color components among the CMYK components may be selectively adjusted, or all the CMYK color components may be adjusted.

Moreover, in the above-described embodiment, description has been given by taking the process of reducing the amounts of the respective CMYK components at the same rate, as an example of the process of reducing the total use amount of color material. However, the process for reducing the total use amount of color material is not limited to this manner, and may be a process of reducing only the CMY components, excluding the K component, at the same rate, or the like. Alternatively, under color removal (UCR) or gray component replacement (GCR) may be used as the process.

Further, in the above-described embodiment, the profiler as a color conversion table creating apparatus is provided separately from the client terminals and the controller. However, the color conversion table creating apparatus may be integrated with the client terminals and/or the controller, and thereby provided as a partial function included in one or some of these devices.

Further, in the above-described embodiment, the controller and the printer, which are provided separately, form the image forming apparatus. However, the image forming apparatus may be formed of a controller and a printer which are integrally provided.

Further, in the above-described embodiment, description has been given by taking an electrophotographic image forming apparatus as an example of the image forming apparatus for which a color conversion table is created. However, the image forming apparatus maybe an ink-jet image forming apparatus.

Further, in the above-described embodiment, the lattice points of 4×4×4×4 in the LUT are interpolated to obtain an extended LUT with lattice points of 11×11×11×11. However, the number of lattice points in the LUT is not limited to the above. The lattice points of 5×5×5×5 in an LUT may be also interpolated to obtain an extended LUT with lattice points of 9×9×9×9, for example.

Further, in the above-described embodiment, description has been given by taking the CMYK-to-L*a*b* LUT as an example of a color conversion table for the image forming apparatus. However, the color conversion table presenting the correspondence between input color values input to the image forming apparatus and output color values in a device-independent color space representing the output colors to be output by the image forming apparatus and corresponding respectively to the input values is not limited to the above, and may be a CMYK-to-XYZ LUT, for example.

The units and the methods for performing the various processes in the print system according to the above-described embodiment can be implemented by any of a dedicated hardware circuit and a computer installed with appropriate programs. The above-described programs may be provided in the form of being stored in a non-transitory computer readable recoding medium such as a flexible disk or a compact disc read only memory (CD-ROM), or may be provided online via a network such as the Internet. In this case, the programs stored in a non-transitory computer readable recording medium are generally transferred to and stored in a storage unit such as a hard disk or the like. In addition, the above-described programs may be provided as separate application software or may be integrated, as a function of the print system, in the software of the device.

What is claimed is:

1. A color conversion table creation method for creating a color conversion table for an image forming apparatus which forms an image by selectively performing, on an input color value with total use amount of color material exceeding set amount, a process for reducing the total use amount, the color conversion table presenting correspondence between the input color value input to the image forming apparatus and an output color value in a device-independent color space indicating an output color to be output from the image forming apparatus and corresponding to the input color value, the color conversion table creation method comprising the steps of:
   (a) acquiring an input color value of a patch image to be used for creating the color conversion table;
   (b) determining whether or not the total use amount of color material defined by the input color value acquired in the step (a) is around the set amount;
   (c) when it is determined in the step (b) that the total use amount of color material is around the set amount, adjusting the input color value of the patch image so that difference between the total use amount and the set amount would be smaller; and
   (d) creating the color conversion table by using the patch image with the input color value adjusted in the step (c).

2. The color conversion table creation method as claimed in claim 1, further comprising, before the step (b), the steps of:
   (e) acquiring a formula for selectively performing, on the input color value with the total use amount of color material exceeding the set amount, the process for reducing the total use amount; and
   (f) finding the set amount by using the formula acquired in the step (e).

3. The color conversion table creation method as claimed in claim 1, further comprising, before the step (b), the steps of:
   (g) acquiring a color conversion table created in advance for the image forming apparatus; and
   (h) analyzing the color conversion table acquired in the step (g), and thereby obtaining the set amount.

4. The color conversion table creation method as claimed in claim 1, further comprising, before the step (b), the steps of:
   (i) acquiring measured color values of a plurality of patch images formed by the image forming apparatus on the basis of predetermined input color values; and
   (j) obtaining the set amount on the basis of the measured color values acquired in the step (i) and the input color values of the patch images.

5. A non-transitory computer readable recording medium stored with a color conversion table creation program for creating a color conversion table for an image forming apparatus which forms an image by selectively performing, on an input color value with total use amount of color material exceeding set amount, a process for reducing the total use amount, the color conversion table presenting correspondence between the input color value input to the image forming apparatus and an output color value in a device-independent color space indicating an output color to be output from the image forming apparatus and corresponding to the input color value, the program causing a computer to execute a process comprising the steps of:
   (a) acquiring an input color value of a patch image to be used for creating the color conversion table;
   (b) determining whether or not the total use amount of color material defined by the input color value acquired in the step (a) is around the set amount;
   (c) when it is determined in the step (b) that the total use amount of color material is around the set amount, adjusting the input color value of the patch image so that difference between the total use amount and the set amount would be smaller; and
   (d) creating the color conversion table by using the patch image with the input color value adjusted in the step (c).

6. The non-transitory computer readable recording medium as claimed in claim 5, the process further comprising, before the step (b), the steps of:
   (e) acquiring a formula for selectively performing, on the input color value with the total use amount of color material exceeding the set amount, the process for reducing the total use amount; and
   (f) finding the set amount by using the formula acquired in the step (e).

7. The non-transitory computer readable recording medium as claimed in claim 5, the process further comprising, before the step (b), the steps of:
   (g) acquiring a color conversion table created in advance for the image forming apparatus; and
   (h) analyzing the color conversion table acquired in the step (g), and thereby obtaining the set amount.

8. The non-transitory computer readable recording medium as claimed in claim 5, the process further comprising, before the step (b), the step of:
   (i) acquiring measured color values of a plurality of patch images formed by the image forming apparatus on the basis of predetermined input color values; and
   (j) obtaining the set amount on the basis of the measured color values acquired in the step (i) and the input color values of the patch images.

9. A color conversion table creating apparatus for creating a color conversion table for an image forming apparatus which forms an image by selectively performing, on an input color value with total use amount of color material exceeding set amount, a process for reducing the total use amount, the color conversion table presenting correspondence between the input color value input to the image forming apparatus and an output color value in a device-independent color space indicating an output color to be output from the image forming apparatus and corresponding to the input color value, the color conversion table creating apparatus comprising:
   an input color value acquisition unit configured to acquire an input color value of a patch image to be used for creating the color conversion table;
   a determination unit configured to determine whether or not the total use amount of color material defined by the input color value acquired by the input color value acquiring unit is around the set amount;
   an adjustment unit configured to adjust the input color value of the patch image so that difference between the total use amount and the set amount would be smaller, when it is determined by the determination unit that the total use amount of color material is around the set amount; and
   a creation unit configured to create the color conversion table by using the patch image with the input color value adjusted by the adjustment unit.

10. The color conversion table creating apparatus as claimed in claim 9, further comprising:
- a formula acquisition unit configured to acquire a formula for selectively performing, on the input color value with the total use amount of color material exceeding the set amount, the process for reducing the total use amount; and
- a finding unit configured to find the set amount by using the formula acquired by the formula acquisition unit.

11. The color conversion table creating apparatus as claimed in claim 9, further comprising:
- a table acquisition unit configured to acquire a color conversion table created in advance for the image forming apparatus; and
- a calculation unit configured to analyze the color conversion table acquired by the table acquisition unit, and thereby obtain the set amount.

12. The color conversion table creating apparatus as claimed in claim 9, further comprising:
- a measured-color-value acquisition unit configured to acquire measured color values of a plurality of patch images formed by the image forming apparatus on the basis of predetermined input color values; and
- a calculation unit configured to obtain the set amount on the basis of the measured color values acquired by the measured-color-value acquisition unit and the input color values of the patch images.

* * * * *